United States Patent
Liu et al.

(10) Patent No.: US 10,562,774 B2
(45) Date of Patent: *Feb. 18, 2020

(54) METHOD FOR SEPARATING CARBON NANOTUBE ARRAY FROM GROWTH SUBSTRATE

(71) Applicants: Tsinghua University, Beijing (CN); HON HAI PRECISION INDUSTRY CO., LTD., New Taipei (TW)

(72) Inventors: Liang Liu, Beijing (CN); Qi Cai, Beijing (CN); Qiu-Qiu Zheng, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 49 days.

This patent is subject to a terminal disclaimer.

(21) Appl. No.: 15/990,938

(22) Filed: May 29, 2018

(65) Prior Publication Data
US 2018/0354802 A1    Dec. 13, 2018

(30) Foreign Application Priority Data
Jun. 7, 2017 (CN) .......................... 2017 1 0423271

(51) Int. Cl.
*C01B 32/162* (2017.01)
*B01J 21/18* (2006.01)
(Continued)

(52) U.S. Cl.
CPC .......... *C01B 32/162* (2017.08); *B01J 21/185* (2013.01); *B82B 3/0004* (2013.01);
(Continued)

(58) Field of Classification Search
CPC . C01B 32/162; C01B 32/168; C01B 2202/24; B82B 3/0004; B82Y 30/00; B82Y 40/00
See application file for complete search history.

(56) References Cited

U.S. PATENT DOCUMENTS

| 2007/0048211 A1 | 3/2007 | Jiang et al. |
| 2011/0135894 A1 | 6/2011 | Liu et al. |
| 2013/0295320 A1 | 11/2013 | Liu et al. |

FOREIGN PATENT DOCUMENTS

| CN | 101348248 A | * | 1/2009 |
| TW | I313670 | | 8/2009 |

(Continued)

OTHER PUBLICATIONS

Wang, Miao, et al. "Wafer-scale transfer of vertically aligned carbon nanotube arrays." Journal of the American Chemical Society 136.52 (2014): 18156-18162.*

(Continued)

*Primary Examiner* — Richard M Rump
(74) *Attorney, Agent, or Firm* — ScienBiziP, P.C.

(57) ABSTRACT

A method for separating a carbon nanotube array grown on a growth substrate from the growth substrate includes providing a carbon nanotube array grown on the growth substrate. The carbon nanotube array includes a plurality of carbon nanotube, each of the plurality of carbon nanotubes includes a top end and a bottom end, and the bottom end is bonded to the growth substrate. The bottom end is oxidized to form an oxidized carbon nanotube array. And then the oxidized carbon nanotube array or the growth substrate is applied to a force.

15 Claims, 2 Drawing Sheets

(51) Int. Cl.
*B82B 3/00* (2006.01)
*C01B 32/168* (2017.01)
*B82Y 30/00* (2011.01)
*B82Y 40/00* (2011.01)

(52) U.S. Cl.
CPC .......... *B82B 3/0014* (2013.01); *C01B 32/168* (2017.08); *B82Y 30/00* (2013.01); *B82Y 40/00* (2013.01)

(56) References Cited

FOREIGN PATENT DOCUMENTS

TW     201125816 A    8/2011
TW     201345830 A    11/2013

OTHER PUBLICATIONS

<span style="font-family: "Windows Arial Unicode";">Kim, Dong Young, et al. "Fluidized-bed synthesis of sub-millimeter-long single walled carbon nanotube arrays." Carbon 50.4 (2012): 1538-1545. </span>.*
Yo-Sep Min et al., Ruthenium Oxide Nanotube Arrays Fabricated by Atomic Layer Deposition Using a Carbon Nanotube Template, Advanced Materials, Jun. 17, 2003, 1019-1022, vol. 15/Iss.12.
Li Qingwen et al., Defect Location of Individual Single-Walled Carbon Nanotubes with a Thermal Oxidation Strategy, J. Phys. Chem. B, Oct. 4, 2002, 11085-11088, 106(43).
Michael Q. Tran et al., Thermal Oxidative Cutting of Multi-Walled Carbon Nanotubes, CARBON, Aug. 1, 2007, 2341-2350, 45(12).

* cited by examiner

METHOD FOR SEPARATING CARBON NANOTUBE ARRAY FROM GROWTH SUBSTRATE

CROSS-REFERENCE TO RELATED APPLICATIONS

This application claims all benefits accruing under 35 U.S.C. § 119 from China Patent Application No. 201710423271.1, filed on Jun. 7, 2017, in the China Intellectual Property Office. This application is related to commonly-assigned application entitled, "METHOD FOR MAKING CARBON NANOTUBE ARRAY", concurrently filed (Ser. No. 15/990,961); "METHOD FOR MAKING CARBON NANOTUBE ARRAY", concurrently filed (Ser. No. 15/990,927); "DEVICE FOR MAKING CARBON NANOTUBE ARRAY", concurrently filed (Ser. No. 15/990,946). Disclosures of the above-identified applications are incorporated herein by reference.

FIELD

The present application relates to a method for separating a carbon nanotube array from a growth substrate.

BACKGROUND

Carbon nanotubes can be composed of a number of coaxial cylinders of graphite sheets, and have recently attracted a great deal of attention for use in different applications, such as field emitters, chemical sensors, and so on. The carbon nanotubes can be prepared by Chemical Vapor Deposition (CVD), Arc Discharge, or Laser Ablation. When a carbon nanotube array is grown on a growth substrate by CVD method, the carbon nanotube array adheres to the growth substrate and it is difficult to separate the carbon nanotube array from the growth substrate. Furthermore, the carbon nanotube array can be peeled from the growth substrate by a knife or a tweezers. However, it is difficult to obtain an integrated carbon nanotube array by peeling the carbon nanotube array from the growth substrate using the knife or the tweezer, because the bonding force between the carbon nanotubes and the growth substrate is strong.

What is needed, therefore, is to provide a method for separating a carbon nanotube array from a growth substrate that can overcome the above-described shortcomings.

Therefore, there is room for improvement in the art.

BRIEF DESCRIPTION OF THE DRAWINGS

Implementations of the present technology will now be described, by way of example only, with reference to the attached figures, wherein.

DETAILED DESCRIPTION

Figure 1:
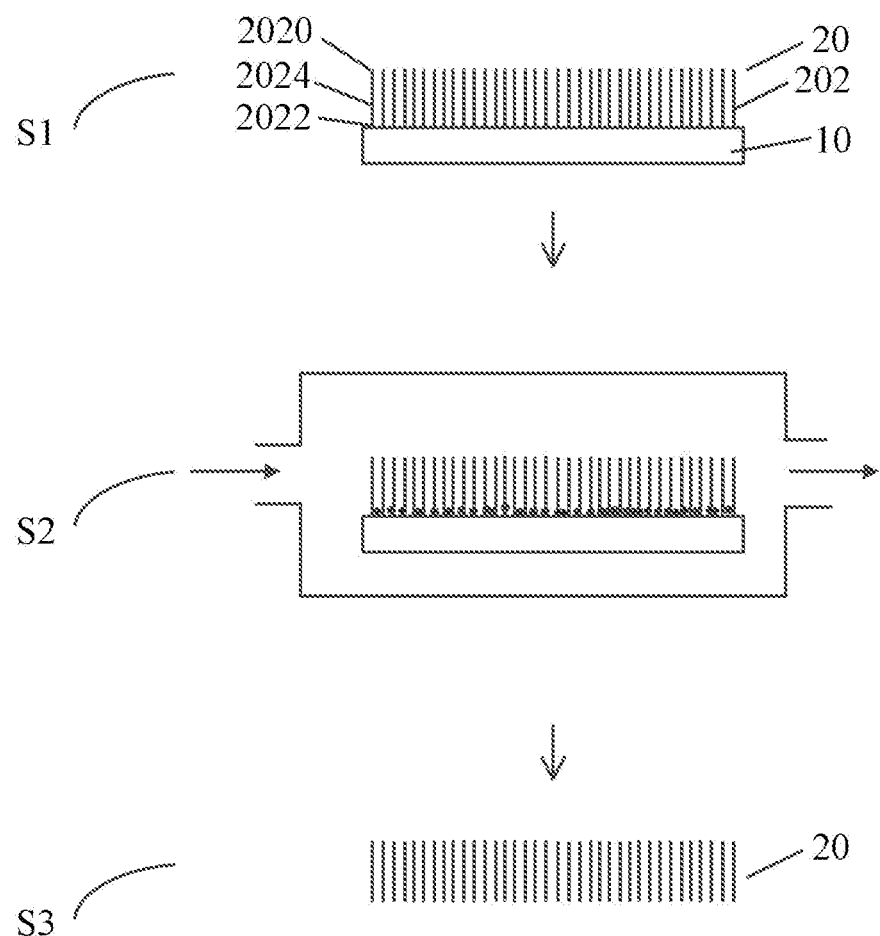
FIG. 1 is a schematic process flow of one embodiment of a method for separating a carbon nanotube array from a growth substrate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a method for separating a carbon nanotube array 20 from a growth substrate 10 includes one or more of the following steps:

S1, providing a carbon nanotube array 20 grown on a growth substrate 10;

S2, oxidizing the carbon nanotube array 20 to form an oxidized carbon nanotube array 20; and S3, separating the oxidized carbon nanotube array 20 from the growth substrate 10.

During step S1, growing the carbon nanotube array 20 on the growth substrate 10 includes the following steps:

S11, depositing a catalyst layer on a substrate surface of the growth substrate 10, to form a composite structure;

S12, placing the composite structure in a first chamber; and S13, growing the carbon nanotube array 20 on the substrate surface of the growth substrate 10 by supplying a carbon source gas and a protective gas to the first chamber and heating the composite structure to a first temperature.

During step S11, the growth substrate 10 is resistant to high temperature. The material of the growth substrate 10 can be silicon, quartz, or the like. In one embodiment, the growth substrate 10 is a silicon wafer, a protective layer is formed on the silicon wafer, for example, the protective layer is a silicon oxide layer, and the thickness of the silicon oxide layer ranges from about 1 nanometer to about 1000 nanometers. The substrate surface can be treated by mechanical polishing or electrochemical polishing, to ensure the smoothness of the substrate surface to meet the needs of growing the carbon nanotube array 20. The shape and size of the growth substrate 10 are not limited. The substrate surface can be flat or curved, and the size of silicon wafer can be 4 inches, 8 inches, or 12 inches.

The thickness of the catalyst layer ranges from about 1 nanometer to about 10 nanometers. In one embodiment, the thickness of the catalyst layer ranges from about 1 nanometer to about 5 nanometers. The catalyst layer can be formed on the substrate surface by evaporation, sputtering, or chemical deposition. The material of the catalyst layer can be iron, cobalt, nickel, or an alloy of any combination thereof. The catalyst layer can further be annealed, the annealing temperature ranges from about 200 degrees Celsius to about 400 degrees Celsius, and the annealing time ranges from about 8 hours to about 12 hours. After annealing the catalyst layer under air atmosphere, the catalyst layer can be oxidized to form metal oxide, and the catalyst layer can become uniformly distributed metal oxide catalyst nanoparticles. The catalytic activity of the catalyst nanoparticles is better than the catalytic activity of the continuous catalyst layer.

If the catalyst layer is deposited on the silicon substrate, the metal of the catalyst layer may react with the silicon substrate to form an alloy, and this alloy would affect the activity of the catalyst layer. Thus, before depositing the catalyst layer on the silicon substrate, a catalyst carrier layer can be formed on the silicon substrate. Thus, the metal of the catalyst layer cannot directly react with the silicon substrate, and the activity of the catalyst layer would not be affected. The material of the catalyst carrier layer can be aluminum (Al), aluminum oxide ($Al_2O_3$), silicon oxide ($SiO_2$), or magnesium oxide (MgO). The thickness of the catalyst carrier layer ranges from about 1 nanometer to about 10 nanometers. In one embodiment, the catalyst carrier layer is an aluminum layer, and the thickness of the aluminum layer ranges from about 3 nanometer to about 7 nanometers.

During step S13, the first temperature is the growth temperature of the carbon nanotube array 20. The first temperature ranges from 600 degrees Celsius to 720 degrees Celsius. In one embodiment, the first temperature ranges from 620 degrees Celsius to 700 degrees Celsius. The composite structure is heated at the first temperature under a protective gas atmosphere, and then the carbon source gas and the protective gas mixture is supplied into the first chamber, so that the carbon nanotube array 20 is grown on the substrate surface by chemical vapor deposition. The time for supplying the carbon source gas and the protective gas mixture ranges from about 10 minutes to about 40 minutes. The time for growing the carbon nanotube array 20 ranges from about 10 minutes to about 40 minutes. The protective gas is an inert gas or nitrogen. The carbon source gas is a hydrocarbon compound, such as acetylene, ethylene, methane, ethane, or the like. During growing the carbon nanotube array 20 on the substrate surface, the pressure in the first chamber ranges from about 2 torrs to 8 torrs.

The carbon source gas, such as acetylene, is pyrolyzed into carbon units (—C≡C— or C) and hydrogen ($H_2$) due to the catalysis of the catalyst layer. When the hydrogen diffuse to the surface of the metal oxide catalyst nanoparticles, the metal oxide catalyst nanoparticles can be reduced to metal catalyst nanoparticles. Thus, the oxidized catalyst layer formed by annealing the catalyst layer under air atmosphere can be reduced and activated. Then, the carbon units are adsorbed on the surface of catalyst layer, thereby growing the carbon nanotube array 20 on the substrate surface.

During step S2, an oxygen containing gas is supplied to the carbon nanotube array 20, and the carbon nanotube array 20 is heated at a second temperature. For example, the carbon nanotube array 20 and the growth substrate 10 are located in a second chamber and the carbon nanotube array 20 is oxidized in the second chamber, or the carbon nanotube array 20 is still oxidized in the first chamber. When the carbon nanotube array 20 is oxidized in the second chamber, the oxygen containing gas is supplied to the second chamber, and the carbon nanotube array 20 is heated at the second temperature by heating the temperature of the second chamber. When the carbon nanotube array 20 is still oxidized in the first chamber, the supplying of the carbon source gas to the first chamber is stopped, the supplying of the protective gas to the first chamber is continued, and the temperature of the first chamber is changed such that the carbon nanotube array 20 is heated to the second temperature. Thus, the carbon nanotube array 20 reacts with the oxygen containing gas and is oxidized at the second temperature, to form the oxidized carbon nanotube array 20.

The carbon nanotube array 20 is oxidized in an environment with a pressure of from 2 torrs to 8 torrs. The second temperature can be in a range from about 500 degrees Celsius to about 800 degrees Celsius. The flow rate of oxygen containing gas ranges from about 300 standard millimeters per minute (sccm) to 500 sccm. The oxygen containing gas can be pure oxygen or air. The reacting time between the carbon nanotube array 20 and the oxygen containing gas is the time for oxidizing the carbon nanotube array 20 by the oxygen containing gas and defined as an oxidizing time. The oxidizing time is in a range from about 5 minutes to about 20 minutes.

The method for heating the carbon nanotube array 20 is not limited. For example, the carbon nanotube array 20 and the growth substrate 10 are placed in the second chamber, and the carbon nanotube array 20 is heated by heating the second chamber at the second temperature. Alternatively, the carbon nanotube array 20 and the growth substrate 10 are placed in a sealed ventilation device, and the carbon nanotube array 20 is heated by heating the growth substrate 10 using a heater. The heater can be a high-frequency furnace or a laser heater. The heater can be formed by carbon nanotubes or electrothermal resistance wires.

In one embodiment, the carbon nanotube array 20 and the growth substrate 10 are placed in the second chamber, the second chamber is heated to 700 degrees Celsius, the flow rate of oxygen containing gas is 500 sccm, and the oxidizing time ranges from about 9 minutes to about 10 minutes. In one embodiment, the carbon nanotube array 20 and the growth substrate 10 are placed in the second chamber, the second chamber is heated to 800 degrees Celsius, the flow rate of oxygen containing gas is 300 sccm, and the oxidizing time ranges from about 5 minutes to about 7 minutes. In one embodiment, the carbon nanotube array 20 and the growth substrate 10 are placed in the second chamber, the second chamber is heated to 500 degrees Celsius, the flow rate of oxygen containing gas is 500 sccm, and the oxidizing time ranges from about 16 minutes to about 20 minutes.

During step S3, the carbon nanotube array 20 can be separated from the growth substrate 10 by just simple mechanical vibration. For example, after the growth substrate 10 and the oxidized carbon nanotube array 20 are taken out of the second chamber, the oxidized carbon nanotube array 20 can be separated from the growth substrate 10 by only shaking the growth substrate 10. Alternatively, tilting the growth substrate 10 and the oxidized carbon nanotube array 20 can fall off the growth substrate 10 because of the gravity of the carbon nanotube array 20 itself. An extending direction of the growth substrate 10 and a horizontal plane form an angle, and the angle is larger than or equal to 30 degrees. In one embodiment, the angle is equal to about 90 degrees. Alternatively, the oxidized carbon nanotube array 20 can be separated from the growth substrate 10 by only reversing the growth substrate 10, and the carbon nanotube array 20 falls only by gravity of the carbon nanotube array 20. Alternatively, the oxidized carbon nanotube array 20 can be separated from the growth substrate 10 by only blowing on the oxidized carbon nanotube array 20, and the force of blowing on the growth substrate 10 is the same order of magnitude as the gravity of the carbon nanotube array 20. In one embodiment, the oxidized carbon nanotube array 20 is separated from the growth substrate 10 by blowing on the oxidized carbon nanotube array 20 using only mouth. Alternatively, the oxidized carbon nanotube array 20 is more easily peeled from the growth substrate 10 using a knife or a tweezers than the non oxidized carbon nanotube array 20. Furthermore, when the growth substrate 10 and the oxidized carbon nanotube array 20 are taken out of the second chamber, taking the growth substrate 10 and the oxidized carbon nanotube array 20 out of the second chamber cannot too fast, and the speed of taking the growth substrate 10 and the oxidized carbon nanotube array 20 out of the second chamber is greater than 0 cm/min and less than 100 cm/min. When the speed of taking the growth substrate 10 and the oxidized carbon nanotube array 20 out of the second chamber is greater than or equal to 100 cm/min, the oxidized carbon nanotube array 20 can fall off the growth substrate 10.

The carbon nanotube array 20 includes a plurality of carbon nanotubes 202. Each carbon nanotube 202 includes a top end 2020, a bottom end 2022, and a middle portion 2024 between the top end 2020 and the bottom end 2022. In the process of growing the carbon nanotube array 20, for each carbon nanotube 202, first the top end 2020 grows, then the middle portion 2024 grows, and finally the bottom end 2022 last grows. At the later growth stage of the carbon nanotube array 20, the catalytic activity of the catalyst layer decreases, so that the bottom end 2022 has more defects than the top end 2020 and the middle portion 2024. When the oxygen containing gas is supplied to the carbon nanotube array 20, the oxygen containing gas can contact with the top end 2020, the bottom end 2022, and the middle portion 2024 of each carbon nanotube 202. However, the oxygen containing gas more easily reacts with the bottom end 2022 than the top end 2020 and the middle portion 2024, because the bottom end 2022 has more defects than the top end 2020 and the middle portion 2024. The reaction between the oxygen containing gas and the bottom end 2022 produces carbon dioxide and weakens the bonding force between each carbon nanotube 202 and the substrate surface of the growth substrate 10. The middle portion 2024 of each carbon nanotube 202 only has a few defects, thus it is not easy for the oxygen containing gas to react with the middle portion 2024 with, thereby keeping the integrity of the carbon nanotube array 20.

After the carbon nanotube array 20 reacts with oxygen containing gas for a period of time, the bonding force between the bottom of each carbon nanotube 202 and the substrate surface become weak by oxidizing the bottom end 2022. Thus, the oxidized carbon nanotube array 20 can be separated from the substrate surface of the growth substrate 10 by only lightly shaking the growth substrate 10, tilting the growth substrate 10, or blowing on the oxidized carbon nanotube array 20 by mouth. Thus, the structure of the carbon nanotube array 20 cannot be destroyed, and an integrated carbon nanotube array 20 can be obtained. Additionally, when the bottom end 2022 of each carbon nanotube 202 is separated from the growth substrate 10, the catalyst layer remains on the substrate surface of the growth substrate 10. The carbon nanotube array 20 contains a few catalyst metal particles or does not contain the catalyst metal particles after being separated from the growth substrate 10, thereby improving the quality or the purity of the carbon nanotube 202.

The second temperature, the oxidizing time, and the flow rate of oxygen containing gas are related to the quality or purity of the carbon nanotube array 20. When the quality of the carbon nanotube array 20 is low, for example, the carbon nanotube array 20 contains many defects and amorphous carbons, the second temperature can be appropriately decreased, the oxidizing time, and the flow rate of oxygen containing gas can be decreased. When the quality or purity of the carbon nanotube array 20 is high, for example, the carbon nanotube array 20 has almost no impurity, the second temperature can be appropriately increased, the oxidizing time can be prolonged, and the flow rate of oxygen containing gas can be increased.

It can be understood that when the second temperature and the flow rate of oxygen containing gas are constant, the oxidizing time cannot be too long or too short as long as the oxidized carbon nanotube array 20 can be separated from the growth substrate 10 easily. When the oxidizing time is too long, the carbon nanotube array 20 is seriously damaged and the height of the carbon nanotube array 20 will be greatly reduced. When the oxidizing time is too short, it is difficult to separate the carbon nanotube array 20 from the growth substrate 10.

The carbon nanotube array 20 of the step S1 and the oxidized carbon nanotube array 20 of the step S2 are the same except for bottom ends 2022. The bottom ends 2022 of the carbon nanotube array 20 of the step S1 are not be oxidized, and the oxidized carbon nanotube array 20 of the step S2 are be oxidized. Furthermore, the carbon nanotube array 20 is a free-standing structure. The term "free-standing" includes, but not limited to, the carbon nanotube array 20 that does not have to be supported by a substrate. For example, the free-standing carbon nanotube array 20 can sustain the weight of itself when it is hoisted by a portion thereof without any significant damage to its structural integrity. So, if the free-standing carbon nanotube array 20 is placed between two separate supporters, a portion of the free-standing carbon nanotube array 20, not in contact with the two supporters, would be suspended between the two supporters and yet maintain film structural integrity. The oxidized carbon nanotube array 20 is also a free-standing structure. The oxidized carbon nanotube array 20 separated from the growth substrate 10 is still a free-standing structure.

Figure 2:
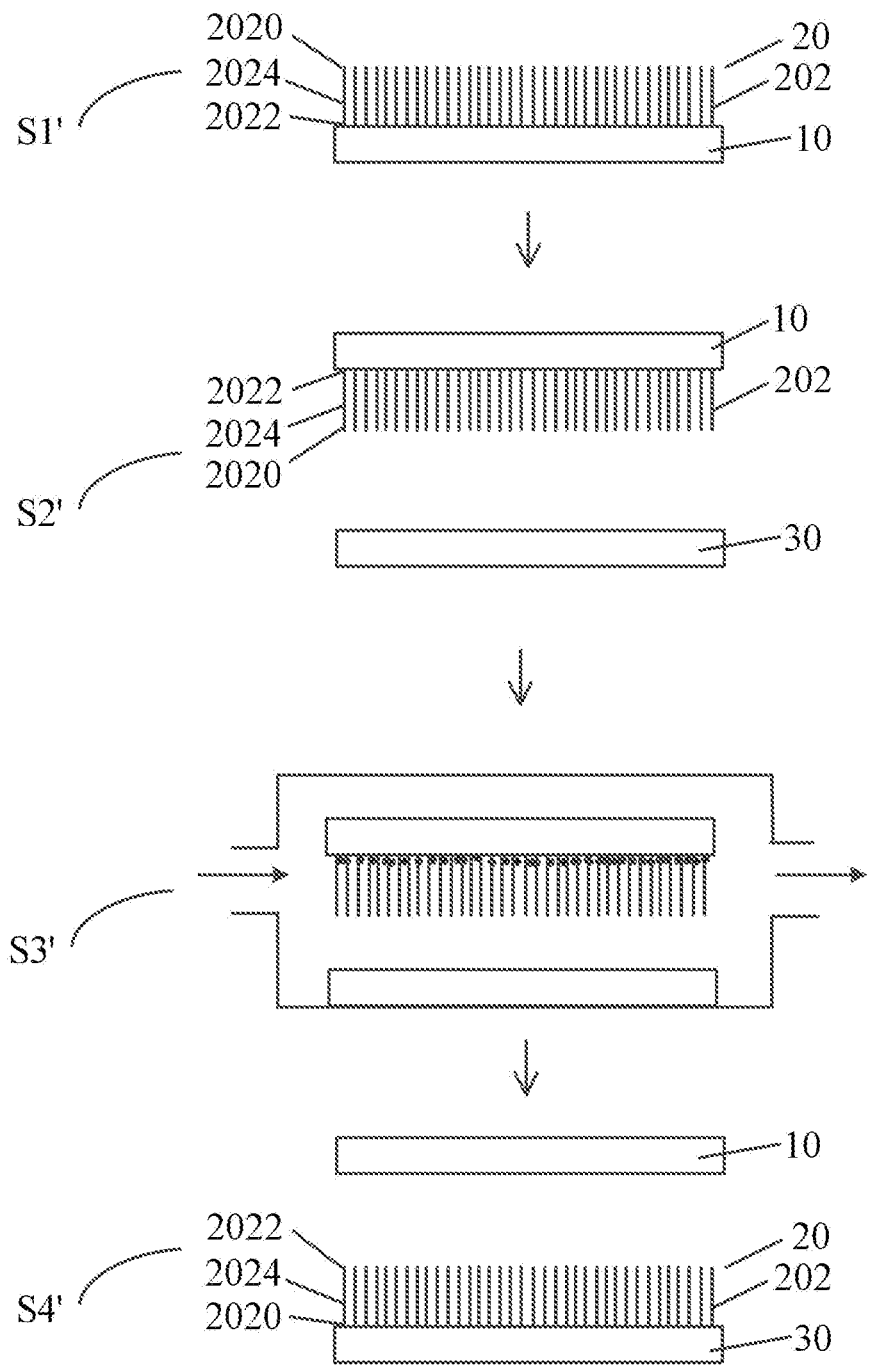
FIG. 2 is a schematic process flow of another embodiment of a method for transferring the carbon nanotube array from the growth substrate to a base.

Referring to FIG. 2, a method for transferring the carbon nanotube array 20 from the growth substrate 10 to a base 30 includes one or more of the following steps:

S1', providing the carbon nanotube array 20 grown on the growth substrate 10, wherein the carbon nanotube array 20 comprises the plurality of carbon nanotubes 202, each of the plurality of carbon nanotubes 202 comprises the top end 2020 and the bottom end 2022 opposite to the top end 2020, the top end 2020 is away from the growth substrate 10, and the bottom end 2022 is bonded to the growth substrate 10;

S2', making the growth substrate 10 above the carbon nanotube array 20, and placing a base 30 below the carbon nanotube array 20; S3', oxidizing the bottom end 2022; and S4', the carbon nanotube array 20 falls on the base 30 from the growth substrate 10 after oxidizing the bottom end 2022.

The method for transferring the carbon nanotube array 20 from the growth substrate 10 to the base 30 is similar to the method for separating the carbon nanotube array 20 from the growth substrate 10 above except that the former further comprises the step S2' and the step S3'. The carbon nanotube array 20 falls on the base 30 only by gravity of the carbon nanotube array 20.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for separating a carbon nanotube array from a growth substrate, the method comprising:
   providing the carbon nanotube array grown on the growth substrate, wherein the carbon nanotube array comprises a plurality of carbon nanotubes, each of the plurality of carbon nanotubes comprises a top end and a bottom end opposite to the top end, the top end is away from the growth substrate, and the bottom end is bonded to the growth substrate;
   oxidizing the bottom end comprising:
      supplying an oxygen containing gas to the carbon nanotube array;
      heating the carbon nanotube array to a preset temperature, wherein a flow rate of the oxygen containing gas ranges from approximately 300 sccm to 500 sccm; and
   applying a force to at least one of the growth substrate and the carbon nanotube array.

2. The method of claim 1, wherein a method for growing the carbon nanotube array comprises:
   depositing a catalyst layer on a substrate surface of the growth substrate, to form a composite structure;
   placing the composite structure in a first chamber; and
   supplying a carbon source gas and a protective gas into the first chamber, and heating the composite structure.

3. The method of claim 2, wherein the method for growing the carbon nanotube array further comprises depositing a catalyst carrier layer on the substrate surface before depositing the catalyst layer.

4. The method of claim 3, wherein a material of the catalyst carrier layer is selected from the group consisting of aluminum, aluminum oxide, silicon oxide, and magnesium oxide.

5. The method of claim 3, wherein a thickness of the catalyst carrier layer ranges from about 1 nanometer to about 10 nanometers.

6. The method of claim 3, wherein the catalyst carrier layer is an aluminum layer, and a thickness of the aluminum layer ranges from about 3 nanometer to about 7 nanometers.

7. The method of claim 1, wherein the temperature is in a range from about 500 degrees Celsius to about 800 degrees Celsius.

8. The method of claim 1, wherein a time for oxidizing the bottom end is in a range from about 5 minutes to about 20 minutes.

9. The method of claim 1, wherein the applying the force to at least one of the growth substrate and the carbon nanotube array comprises shaking the growth substrate.

10. The method of claim 1, wherein the applying the force to at least one of the growth substrate and the carbon nanotube array comprises tilting the growth substrate, an extending direction of the growth substrate and a horizontal plane form an angle, and the angle is larger than or equal to 30 degrees.

11. The method of claim 1, wherein the applying the force to at least one of the growth substrate and the carbon nanotube array comprises blowing on the carbon nanotube array.

12. A method for transferring a carbon nanotube array, the method comprising:
   providing a carbon nanotube array grown on a growth substrate, wherein the carbon nanotube array comprises a plurality of carbon nanotubes, each of the plurality of carbons nanotubes comprises a top end and a bottom end opposite to the top end, the top end is away from the growth substrate, and the bottom end is bonded to the growth substrate;
   flipping the growth substrate over such that the top ends of the plurality of carbon nanotubes are gravitationally facing down, and placing a base facing the top ends of the plurality of carbon nanotubes; and
   oxidizing the bottom end so that the carbon nanotube array falls on the base, wherein the method of oxidizing the bottom end comprises supplying an oxygen containing gas to the carbon nanotube array and heating the carbon nanotube array to a preset temperature, and a flow rate of the oxygen containing gas ranges from approximately 300 sccm to 500 sccm.

13. The method of claim 12, wherein the temperature is in a range from about 500 degrees Celsius to about 800 degrees Celsius.

14. The method of claim 12, wherein a time for oxidizing the bottom end is in a range from about 5 minutes to about 20 minutes.

15. The method of claim 12, wherein the carbon nanotube array falls on the base only by gravity.

* * * * *